United States Patent [19]

Stones et al.

[11] Patent Number: 5,557,781
[45] Date of Patent: Sep. 17, 1996

[54] COMBINATION ASYNCHRONOUS CACHE SYSTEM AND AUTOMATIC CLOCK TUNING DEVICE AND METHOD THEREFOR

[75] Inventors: Mitchell A. Stones, Phoenix; Nicholas J. Richardson, Tempe, both of Ariz.

[73] Assignee: VLSI Technology Inc., San Jose, Calif.

[21] Appl. No.: 92,151

[22] Filed: Jul. 15, 1993

[51] Int. Cl.⁶ ........................................................ G06F 1/04
[52] U.S. Cl. .................. 395/550; 364/243.41; 364/271.5; 364/DIG. 1
[58] Field of Search ..................................... 395/550, 375, 395/800; 327/161; 364/271.5, 243.41

[56] References Cited

U.S. PATENT DOCUMENTS

| | | | |
|---|---|---|---|
| 4,063,308 | 12/1977 | Collins et al. | 395/550 |
| 4,714,924 | 12/1987 | Ketzler | 340/825.21 |
| 5,003,256 | 3/1991 | Merrill | 324/158 |
| 5,365,130 | 11/1994 | Murray et al. | 327/278 |
| 5,382,850 | 1/1995 | Aldrich et al. | 327/161 |

Primary Examiner—Kevin A. Kriess
Assistant Examiner—Dennis M. Butler
Attorney, Agent, or Firm—Harry M. Weiss

[57] ABSTRACT

A combination asynchronous cache system and automatic clock tuning device is disclosed in which the automatic clock tuning device includes at least a pulse generator, a counter, a unit delay tree, a comparing device, and a feedback path. A portion of the feedback path delivers a signal of interest off of the device chip in order that the signal experience the effect of the actual system impedance prior to being returned to the device chip for further manipulation of the signal. A major concept of the automatic clock tuning device is to enable a cache data/tag Write Enable (WE) signal to be clocked off of the falling edge of a delayed version of the System Clock (SCLK). This Delayed Clock (DCLK) signal is automatically delayed by a pre-selected amount each time that the rising edge of the WE signal occurs earlier than the rising edge of the SCLK signal. As long as the rising edge of the WE signal occurs slightly before or at the same time as the rising edge of the SCLK signal the CPU address/data hold time is successfully accomplished without adding superfluous wait states.

20 Claims, 2 Drawing Sheets

COMBINATION ASYNCHRONOUS CACHE SYSTEM AND AUTOMATIC CLOCK TUNING DEVICE AND METHOD THEREFOR

FIELD OF THE INVENTION

This invention relates generally to asynchronous cache system devices and, more specifically, to a combined asynchronous cache system and automatic clock tuning device and method therefor which provides a clock tuning device that automatically delays a System Clock (SCLK) signal to produce a Delayed Clock (DCLK) signal that defines the time at which a logic level transition of a Write Enable (WE) signal takes place in order to ensure that a Central Processing Unit (CPU) address/data hold time is accomplished without adding unnecessary wait states.

DESCRIPTION OF THE PRIOR ART

The problem to be solved pertains to an asynchronous cache sub-system. In particular, it is possible for an address/data hold time violation to occur relative to a WE signal transition from a low to a high state with an asynchronous cache data/tag Static Random Access Memory (SRAM) device. In short, this means that if a data transfer is prematurely terminated, then when the WE signal executes a transition from a low to a high state, the incorrect data is latched into the SRAM device. In X86 CPU based systems, the address and the data signals turn off synchronous with the transition of the SCLK signal from a low state to a high state. Since the WE signal is a controlled pulse width, it is desirable that the WE signal also be synchronous. Unfortunately, when the WE signal is synchronized to the low state to high state transition of the SCLK signal, the possibility exists that the output delay of the WE signal may be longer than the address/data hold time delay of the CPU. Consequently, in this case, spurious data is written to the cache SRAM devices and the cache sub-system fails operate properly.

One possible solution to the aforementioned problem is to clock the WE signal off of the negative edges of the SCLK signal, thereby ensuring that the output rise delay time of the WE signal occurs before the next rising edge of the SCLK signal. This approach creates a performance penalty of one CPU clock (1 SCLK) due to the delay of the activation of the WE signal by ½ SCLK.

Another possible solution to this problem might be to use a synchronous data/tag SRAM device. These devices include an input for the system clock which samples the address/data on the rising edges of the SCLK signal when the WE signal is held active. The inclusion of the SCLK signal input to these synchronous data/tag SRAM devices effectively removes the hold time problem associated with the use of asynchronous SRAM devices. However, these synchronous SRAM devices are significantly more expensive than their asynchronous SRAM device counterparts. Therefore, a need existed to provide a cost-effective, asynchronous cache sub-system without creating a performance penalty by adding an extra SCLK period in order to ensure CPU address/data hold time during cache data or tag SRAM device updates.

SUMMARY OF THE INVENTION

In accordance with one embodiment of this invention, it is an object of this invention to provide an automatic clock tuning device.

It is another object of this invention to provide a combined asynchronous cache system and automatic clock tuning device and method therefor.

It is a further object of this invention to provide a combined asynchronous cache system and automatic clock tuning device that ensures that a CPU address/data hold time is accomplished without adding unnecessary wait states.

It is still another object of this invention to provide a combined asynchronous cache system and automatic clock tuning device that uses feedback of an actual system signal in order to include the system impedance.

It is yet another object of this invention to provide a combined asynchronous cache system and automatic clock tuning device which produces a delay unit that has a maximum value that is less than or equal to a processor's maximum hold time for address and data relative to SCLK.

It is a further object of this invention to provide a combined asynchronous cache system and automatic clock tuning device that automatically disables the tuning process of DCLK upon reaching a pre-defined condition in order to conserve energy.

BRIEF DESCRIPTION OF THE PREFERRED EMBODIMENTS

In accordance with one embodiment of this invention, a combination asynchronous cache system and automatic clock tuning device is disclosed comprising, in combination, an asynchronous cache system and an automatic clock tuning device coupled to the asynchronous cache system and comprising, in combination, counter means for counting the number of occurrences that an INCREMENT signal input is sampled in a desired state and for producing an output count signal corresponding to the number of occurrences, variable delay means coupled to a System Clock (SCLK) signal and to the output count signal for producing a Delayed Clock (DCLK) signal where the SCLK signal is delayed by the variable delay means by an amount proportional to the output count signal to produce the DCLK signal, output means coupled to the DCLK signal for delivering a Write Enable (WE) signal to an external system load and to a portion of the automatic clock tuning device, comparing means coupled to both the WE signal and to the SCLK signal for outputting the INCREMENT signal when the comparing means samples an occurrence of a rising edge of the WE signal prior to an occurrence of a rising edge of the SCLK signal, an OR-Gate coupled to the comparing means, feedback Flip-Flop means having a data input junction coupled to the INCREMENT signal for providing an output for driving at least one input junction of the OR-Gate, first D-type Flip-Flop means having a data input junction coupled to an output of the OR-Gate for providing data input to the output means, second D-type Flip-Flop means having a data input junction coupled to the output from the first D-type Flip-Flop means for providing the SCLK signal to the comparing means, pulse generator means coupled to a RESET signal input and the SCLK signal input for generating an initial START PULSE signal output coupled to an input junction of the OR-Gate, NOR-Gate means having at least a first active low input junction coupled to the RESET signal for clearing data content of each of the first D-type Flip-Flop means, the second D-type FlipFlop means, and the comparing means, and maximum count detection means coupled to the counter means and to a second active low input junction of the NOR-Gate means for clearing data content of each of the first D-type Flip-Flop means, the second D-type Flip-Flop means, and the comparing means in response to the maximum count detection means reaching a maximum count condition.

In accordance with another embodiment of this invention, a method of operating a combination asynchronous cache system and automatic-clock tuning device is provided comprising the steps of providing an asynchronous cache system and providing an automatic clock tuning device coupled to the asynchronous cache system and comprising the steps of providing counter means for counting the number of occurrences that an INCREMENT signal input is sampled in a desired state and for producing an output count signal corresponding to the number of occurrences, providing variable delay means coupled to a System Clock (SCLK) signal and to the output count signal for producing a Delayed Clock (DCLK) signal where the SCLK signal is delayed by the variable delay means by an amount proportional to the output count signal to produce the DCLK signal, providing output means coupled to the DCLK signal for delivering a Write Enable (WE) signal to an external system load and to a portion of the automatic clock tuning device, providing comparing means coupled to both the WE signal and to the SCLK signal for outputting the INCREMENT signal when the comparing means samples an occurrence of a rising edge of the WE signal prior to an occurrence of a rising edge of the SCLK signal, providing an OR-Gate coupled to the comparing means, providing feedback Flip-Flop means having a data input junction coupled to the INCREMENT signal for providing an output for driving at least one input junction of the OR-Gate, providing first D-type Flip-Flop means having a data input junction coupled to an output of the OR-Gate for providing data input to the output means, providing second D-type Flip-Flop means having a data input junction coupled to the output from the first D-type Flip-Flop means for providing the SCLK signal to the comparing means, providing pulse generator means coupled to a RESET signal input and the SCLK signal input for generating an initial START PULSE signal output coupled to an input junction of the ORGate, providing NOR-Gate means having at least a first active low input junction coupled to the RESET signal for clearing data content of each of the first D-type Flip-Flop means, the second D-type Flip-Flop means, and the comparing means, and providing maximum count detection means coupled to the counter means and to a second active low input junction of the NOR-Gate means for clearing data content of each of the first D-type Flip-Flop means, the second D-type Flip-Flop means, and the comparing means in response to the maximum count detection means reaching a maximum count condition.

In accordance with yet another embodiment of this invention, a combination asynchronous cache system and automatic clock tuning device is disclosed comprising, in combination, an asynchronous cache system and an automatic clock tuning device coupled to the asynchronous cache system and comprising, in combination, a first closed loop means for generating an output signal for use by the asynchronous cache system and having at least a counter device, a variable delay device, an output portion, and a comparator, and a second closed loop means for providing a data signal to a portion of the first closed loop means and having at least an OR-Gate and a plurality of Flip-Flops where the second closed loop means is coupled to the comparator. In addition, this device further includes means for clearing data contents of the plurality of Flip-Flops and the comparator. Furthermore, this automatic clock tuning device includes pulse generator means coupled to a RESET signal input and a SCLK signal input for generating an initial START PULSE signal output coupled to an input junction of the OR-Gate. Also, this device includes maximum count detection means coupled to a portion of each of the first closed loop means and the second closed loop means for clearing data content of a portion of each of the first closed loop means and the second closed loop means in response to the maximum count detection means reaching a maximum count condition.

The forgoing and other objects, features, and advantages of the invention will be apparent from the following, more particular, description of the preferred embodiments of the invention, as illustrated in the accompanying drawings.

DESCRIPTION OF THE PREFERRED EMBODIMENT

Figure 1:
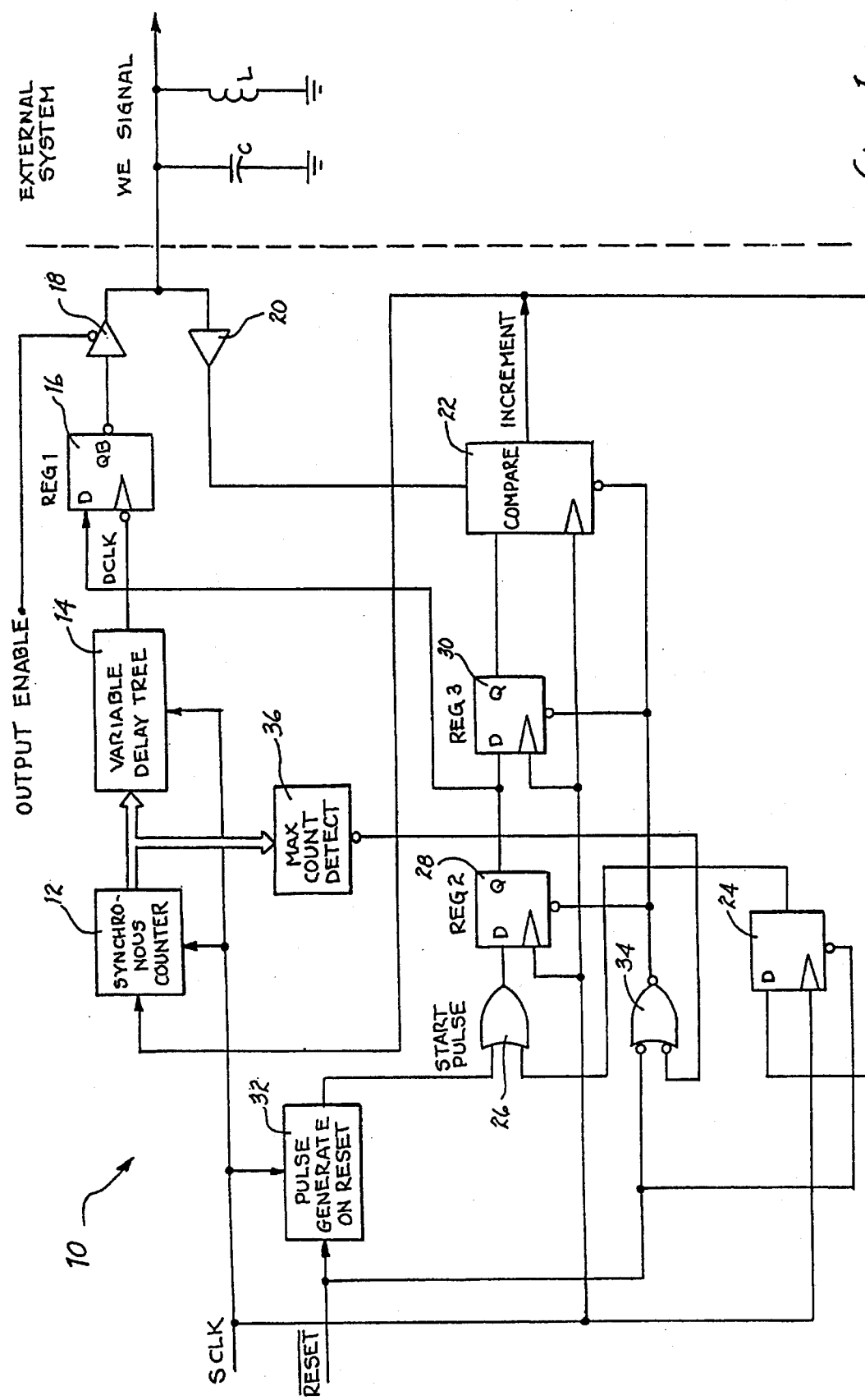
FIG. 1 is a simplified block diagram of the automatic clock tuning device attached to an external system load.

Referring to FIG. 1, a simplified block diagram of the automatic clock tuning device is shown and is generally designated by reference number 10. Note that in this embodiment the automatic clock tuning device 10 is part of a controller for a cache device which is not shown here for the sake of simplicity. In addition, note that although the device 10 is intended for use as part of a cache controller, if desired, this device 10 could be integrated into other systems that require the functions performed by the device 10. A System Clock (SCLK) signal is coupled to a synchronous counter 12, a variable delay tree 14, a pulse generator 32, a first D-Type Flip-Flop 28 corresponding to register 2, a second D-Type Flip-Flop 30 corresponding to register 3, a comparing device such as a comparator 22, and a D-Type Flip-Flop 24. Note that the D-Type Flip-Flop 24 is also called the feedback Flip-Flop 24. An active low RESET signal, hereinafter simply referred to as the RESET signal, is coupled to the pulse generator or pulse generator on reset 32, a NOR-Gate 34, and the feedback Flip-Flop 24.

Again, in reference to FIG. 1, the synchronous counter 12 has an input junction coupled to an INCREMENT signal coming from the comparing device 22. The synchronous counter 12 samples the INCREMENT signal and counts the number of occurrences of a specific logic level of this signal and then outputs a signal corresponding to the count. In addition, the synchronous counter 12 has a pre-selected maximum level up to which it can count. The variable delay tree 14 is coupled to the output count signal from the synchronous counter 12 in order to select a delay which is proportional to the output count signal. The range of the synchronous counter 12 is large enough to ensure that the DCLK signal is capable of being shifted at least ½ period of the SCLK signal regardless of any conceivable process, temperature, and/or operating voltage conditions that may result in a minimum unit delay from the variable delay tree 14. The variable delay tree 14 applies this selected delay to the SCLK input to create a Delayed Clock (DCLK) signal output. The DCLK signal is applied to an active low input clock junction for the register 1 or the D-Type Flip-Flop 16.

The data input junction of the D-Type Flip-Flop 16 is coupled to the output junction of the first D-Type Flip-Flop 28. The active low output junction of Flip-Flop 16 is coupled to an output driver 18 which delivers a Write Enable (WE) signal to an external system load which is modeled as a capacitor C and an inductor L. Such an external system might be representative of cache memory devices such as Static Random Access Memory (SRAM) devices. The inherent impedance of the external system is reflected in the signal returned to the automatic clock tuning device 10 via the input driver 20. The input driver 20 and the output driver 18 comprise a bidirectional I/O driver and, in addition, this bidirectional I/O driver together with the Flip-Flop 16 comprise an output stage for the device 10. Note that the output driver 18 is coupled to an OUTPUT ENABLE signal to enable this driver 18. The output of the input driver 20 is coupled to the comparing device 22. In addition, the comparing device 22 is coupled to the output signal from the second D-Type Flip-Flop 30. This signal represents the SCLK signal so that the comparing device 22 compares the rising edge of the WE signal to the rising edge of the SCLK signal. If the rising edge of the WE signal occurs prior to the rising edge of the SCLK signal, then the comparing device 22 outputs an INCREMENT pulse to both the synchronous counter 12 and the data input of the feedback Flip-Flop 24. The output of the feedback Flip-Flop 24 is coupled to an input junction of the OR-Gate 26 and the output of the OR-Gate 26 is coupled to the data input for the first D-Type Flip-Flop 28. The output of the first D-Type Flip-Flop 28 is coupled to both the data input for the D-Type Flip-Flop 16 and the data input for the second D-Type Flip-Flop 30.

The output of the pulse generator 32 is coupled to an input junction of the OR-Gate 26 in order to generate an initial START PULSE signal upon a computer system start up. The RESET signal is coupled to an active low input junction of the NOR-Gate 34 so that upon system start up, the data content of each of the first D-Type Flip-Flop 28, the second D-Type Flip-Flop 30, and the comparing device 22 are cleared. Also, note that the RESET signal is directly connected to an active low input junction to clear the data content of the feedback Flip-Flop 24 upon system start up. The maximum count detect device 36 is coupled to the output count signal coming from the synchronous counter 12. At a pre-selected maximum count, the maximum count detect device 36 sends a signal to an active low input junction of the NOR-Gate 34 in order to clear the data content of each of the first D-Type Flip-Flop 28, the second D-Type Flip-Flop 30, and the comparing device 22, thereby reducing the amount of energy consumed by the device 10.

OPERATION

The automatic clock tuning device 10 works by creating a positive START PULSE after system start up. This pulse is then sampled by two separate registers, namely registers 1 and 2. Register i clocks the pulse on the falling edge of the DCLK signal that is initially synchronous to the SCLK signal. Resister 1 then inverts the output signal. Register 2 clocks the initial pulse on the rising edge of the SCLK signal. The negative pulse generated by register 1 is directed off of the device 10 chip to an externally coupled cache data or tag SRAM device's WE signal junction, thereby seeing the actual system impedance. This same signal is fed back via the bidirectional I/O device 18 and 20. The output pulse of register 2 is sampled once more with the rising edge of the SCLK signal by register 3. The output of register 3 is used to enable a comparison of the rising edge of the SCLK signal to the rising edge of the WE signal. If the rising edge of the WE signal occurs prior to the rising edge of the SCLK signal, an INCREMENT pulse is output from the comparing device 22. This INCREMENT pulse is counted by the synchronous counter 12 whose output is used by the variable delay tree 14 to add one unit delay to the DCLK signal. The INCREMENT pulse is also fed back to the input of the feedback Flip-Flop 24 whose output is coupled to the data input of register 2, and subsequently, to the data input of register 1. This process is repeated until the rising edge of the WE signal occurs at approximately the same time as the rising edge of the SCLK signal and, at this time, no further INCREMENT pulses are generated.

The following signal descriptions should help to facilitate a better understanding of the subsequent timing diagrams:

SCLK: SYSTEM CLOCK is used to synchronize a CPU and a cache controller.

CYC_START: CYCLE START is issued by the CPU to indicate the beginning of the CPU bus cycle.

READYO: READY OUT is driven active low by the cache controller to indicate that a data transfer has been completed.

DATA: WRITE DATA is driven by the CPU when it is attempting to write data to memory.

DCLK: DELAYED CLOCK is driven by the automatic clock tuning device 10 of a cache controller and this signal is used to synchronize the WE signal.

WE: WRITE ENABLE is an active low signal driven by the automatic clock tuning device 10 of a cache controller to the cache memory. A rising edge of the WE signal latches data into memory.

START_PULSE: START PULSE is driven by the pulse generator 32 on system start up.

REG1_QB(WE): REGISTER1OUTPUTfWE) is the WE signal output of register 1.

REG2_Q: REGISTER2 OUTPUT is the output of register 2.

REG3_Q: REGISTER3 OUTPUT is the output of register 3.

INCREMENT: INCREMENT is driven by the comparing device 22 when the rising edge of the WE signal occurs prior to the sampling of the rising edge of the SCLK signal.

Figure 2:
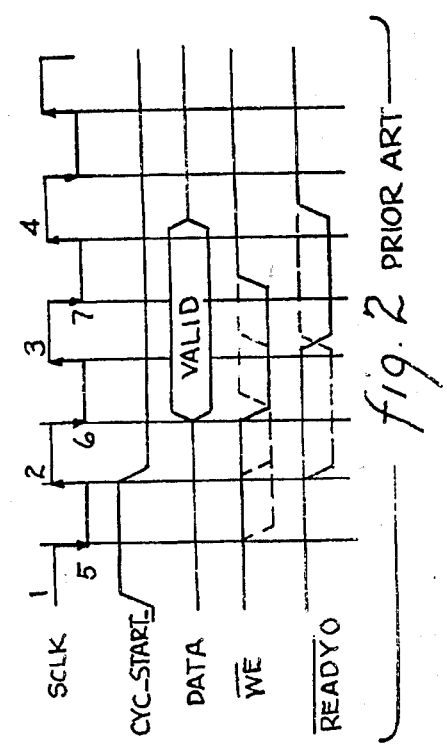
FIG. 2 is a timing diagram showing a prior art approach to executing a cache write cycle.

Referring to FIG. 2, the CPU signifies the beginning of a CPU bus cycle by driving the CYC_START signal high at 1. The WE signal is shown going low and then high between point 6 and 7, and, in addition, the WE signal is shown in phantom making a similar logic transition between the falling edges of SCLK at 5 and 6 and between the rising edges of SCLK at 2 and 3. Note that the WE signal transition requires one full period of the SCLK signal. The READYO signal is shown going logic low and then logic high at points 3 and 4, respectively, and a similar transition is shown in phantom between points 2 and 3. The write cycle, which is defined as the time between the CYC_START signal going high and the READYO signal being sampled low, requires three full periods of the SCLK signal, namely from points 1 to 4. The write cycle could be shortened if the WE signal was clocked off of the SCLK signal at points 5 and 6 or points 2 and 3. However, if the WE signal was clocked off at points 5 and 6, the data setup time to WE transitioning high would be violated, and the write cycle would be unsuccessful. Setup time is defined as the time from which data transmission begins until the time that the WE signal goes high to latch in the data to memory. There is a minimum allowable setup time and by clocking WE off of points 5 and 6, WE goes high too soon to allow the appropriate setup time. If the WE signal was clocked off of points 2 and 3 thereby allowing the READYO signal to be moved left to be clocked off of points 2 and 3, one clock cycle would be saved, however, the CPU would stop driving the DATA signal on edge 3, and the data hold time relative to the WE signal low to high transition would be violated. In other words, since the data ceases at point 3, when the WE signal goes high just to the right of point 3, the incorrect data is latched into memory.

Figure 3:
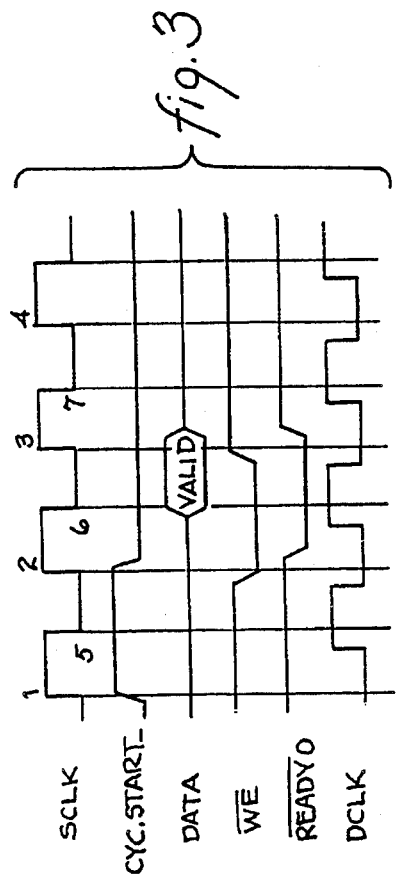
FIG. 3 is a simplified timing diagram showing the automatic clock tuning device executing a cache write cycle.

Referring to FIG. 3, with the introduction of the new delayed clock signal DCLK from the automatic clock tuning device 10, the WE signal is clocked high at some time after the SCLK edge at point 6 and before the SCLK edge at point 7 to create several advantages. The entire write cycle would require only two SCLK periods, namely from point 1 to point 3. The required data setup time is met. In addition, note that at the time the WE signal makes the low to high transition, the data signal is still present so that the hold time requirement is successfully accomplished.

Figure 4:
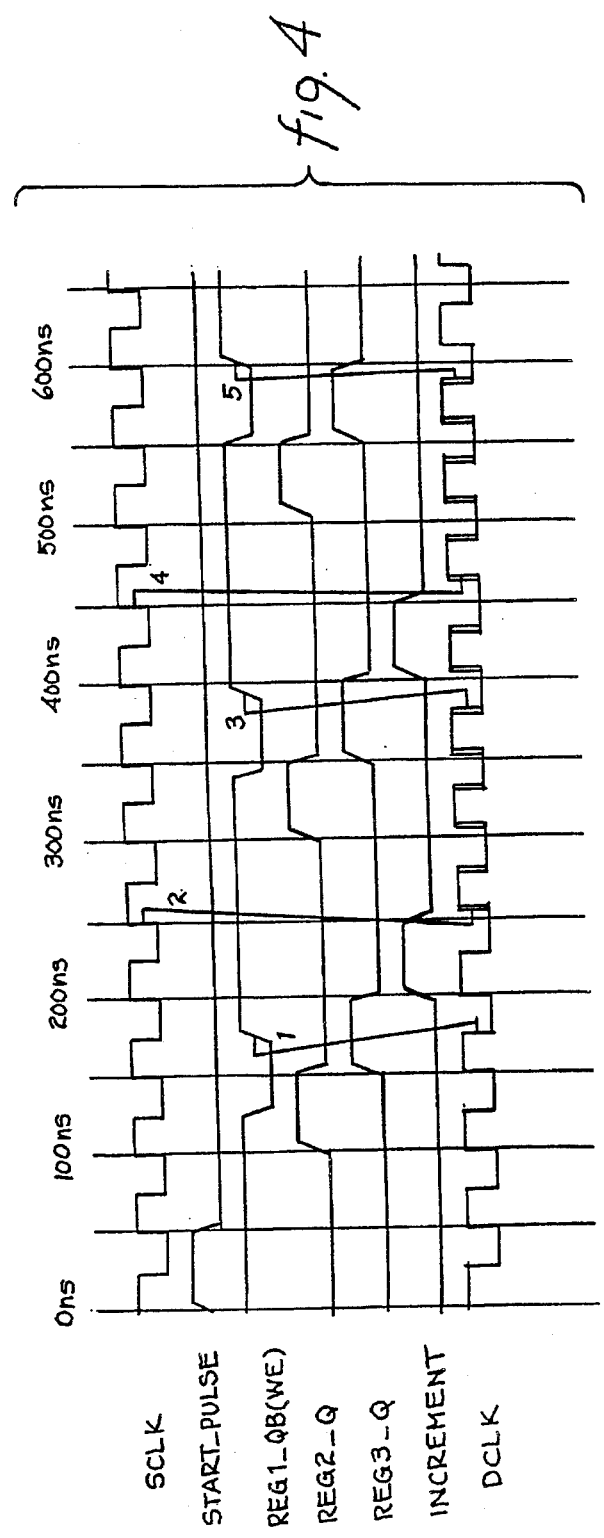
FIG. 4 is a simplified timing diagram showing the start up operation of the automatic clock tuning device.

Referring to FIG. 4, a timing diagram shows the start up sequence for the automatic clock tuning device 10. Of particular interest, reference point 1 shows the DCLK signal going low to drive the WE signal high. Also, note that at this point the SCLK signal and the DCLK signal are in phase. In addition, at reference point 1, the rising edge of the WE signal lags the rising edge of the SCLK signal located at the 200ns point. This lagging condition of the WE signal relative to the SCLK signal is detected by the comparing device 22, and consequently, one notices that the DCLK signal begins to shift to the right, thereby creating a noticeable phase difference between DCLK and SCLK at reference point 2. At reference point 3, the falling edge of the DCLK signal triggers the rising edge of the WE signal, and note that the WE signal has moved farther to the right or closer to the rising edge of the SCLK signal at the 400ns point. At reference point 4, note again that the DCLK signal has been phase shifted farther to the right. At reference point 5, the falling edge of the DCLK signal causes the rising transition of the WE signal. Both the DCLK signal and the WE signal have clearly been shifted to the right when one compares their positions relative to the SCLK signal at reference point 1 as compared to their positions at reference point 5. Also, one observes that the rising edge of the WE signal has occurred at nearly the same time as the SCLK rising edge at reference point 5.

While the invention has been particularly shown and described with reference to the preferred embodiments thereof, it will be understood by those skilled in the art that the foregoing and other changes in form and details may be made therein without departing from the spirit and scope of the invention. For example, the period for the SCLK signal could be changed to 30ns or any other desirable value. In addition, the device 10 defines an INCREMENT signal which results in shifting the DCLK and the WE signals to the right, however, if desired, one could implement a means for shifting these or other signals to the left with respect to a time axis.

I claim:

1. A combination asynchronous cache system and automatic clock tuning device, comprising, in combination:

an asynchronous cache system; and an automatic clock tuning device coupled to said asynchronous cache system and comprising, in combination:

counter means for counting the number of occurrences that an INCREMENT signal input is sampled in a desired state and for producing an output count signal corresponding to said number of occurrences;

variable delay means coupled to means for providing a System Clock signal (SCLK) and to a portion of said counter means which produces said output count signal for producing a Delayed Clock (DCLK) signal, said SCLK signal being delayed by said variable delay means by an amount proportional to said output count signal to produce said DCLK signal;

output means coupled to a portion of said variable delay means which produces said DCLK signal for delivering a Write Enable (WE) signal to said asynchronous cache system;

comparing means coupled to a portion of said output means which delivers said WE signal and to said means for providing said SCLK signal for outputting said INCREMENT signal when said comparing means samples an occurrence of a rising edge of said WE signal prior to an occurrence of a rising edge of said SCLK signal;

feedback Flip-Flop means having a data input junction coupled to a portion of said comparing means which outputs said INCREMENT signal for providing an output signal;

an OR-Gate having an input junction coupled to a portion of said feedback Flip-Flop means which provides said output signal;

first D-type Flip-Flop means having a data input junction coupled to an output of said OR-Gate and having an output coupled to said output means for providing data input to said output means;

second D-type Flip-Flop means having a data input junction coupled to said output of said first D-type Flip-Flop means for providing said SCLK signal to said comparing means;

pulse generator means coupled to a means for providing a RESET signal input and said means for providing said SCLK signal input for generating an initial START PULSE signal output coupled to an input junction of said OR-Gate;

NOR-Gate means having an active low input junction coupled to said means for providing said RESET signal and an output coupled to said first D-type Flip-Flop means, said second D-type Flip-Flop means, and said comparing means for clearing data content of each of said first D-type Flip-Flop means, said second D-type Flip-Flop means, and said comparing means; and maximum count detection means coupled to said counter means and to a second active low input junction of said NOR-Gate means for clearing data content of each of said first D-type Flip-Flop means, said second D-type Flip-Flop means, and said comparing means in response to said maximum count detection means reaching a maximum count condition and sending a signal to said second active low input junction of said NOR-Gate to clear said data content of said first D-type Flip-Flop means, said second D-type Flip-Flop means, and said comparing means.

2. The device of claim 1 wherein said counter means has a preselected maximum level up to which said counter means can count.

3. The device of claim 1 wherein said output means is provided with a D-type Flip-Flop having an active low input junction coupled to said portion of said variable delay means which produces said DCLK signal.

4. The device of claim 3 wherein said D-type Flip-Flop is provided with an active low output junction coupled to a bidirectional Input/Output (I/O) driver.

5. The device of claim 4 wherein said bidirectional I/O driver is provided with an output driver coupled to said active low output junction of said D-type Flip-Flop and an input driver coupled to an output of said output driver.

6. The device of claim 5 wherein said output driver is provided with an input junction for receiving an OUTPUT ENABLE signal.

7. The device of claim 1 wherein said means for providing a SCLK signal is coupled to each of said counter means, said variable delay means, said comparing means, said feedback Flip-Flop means, said first D-type Flip-Flop means, said second D-Type Flip-Flop means, and said pulse generator means.

8. The device of claim 1 wherein said means for providing said RESET signal is coupled to each of said pulse generator means, said NOR-Gate means, and said feedback Flip-Flop means.

9. The device of claim 1 wherein said external system load comprising at least a plurality of Static Random Access Memory (SRAM) type devices.

10. A combination asynchronous cache system and automatic clock tuning device, comprising, in combination:

an asynchronous cache system; and an automatic clock tuning device coupled to said asynchronous cache system and comprising, in combination:

a first closed loop means for generating an output signal for use by said asynchronous cache system and having a counter device, a variable delay device coupled to an output of said counter device, an output portion coupled to an output of said variable delay device, and a comparator coupled to an output of said output portion; and a second closed loop means coupled to said comparator of said first closed loop means for providing a data signal to said comparator of said first closed loop means and having at least an OR-Gate and a plurality of Flip-Flops wherein a first Flip-Flop is coupled to an output of said OR-Gate and each successive Flip-Flop is coupled to an output of a previous Flip-Flop.

11. The device of claim 10 further including means coupled to each of said plurality of Flip-Flops and to said comparator for clearing data contents of said plurality of Flip-Flops and said comparator.

12. The device of claim 10 further including pulse generator means coupled to means for providing a RESET signal input and means for providing a SCLK signal input for generating an initial START PULSE signal output coupled to an input junction of said OR-Gate.

13. The device of claim 10 further including maximum count detection means coupled to a portion of each of said first closed loop means and said second closed loop means for clearing data content of a portion of each of said first closed loop means and said second closed loop means in response to said maximum count detection means reaching a maximum count condition.

14. A method of operating a combination asynchronous cache system and automatic clock tuning device comprising the steps of:

providing an asynchronous cache system; and providing an automatic clock tuning device coupled to said asynchronous cache system and comprising, in combination:

providing counter means for counting the number of occurrences that an INCREMENT signal input is sampled in a desired state and for producing an output count signal corresponding to said number of occurrences;

providing variable delay means coupled to means for providing a System Clock signal (SCLK) and to a portion of said counter means which produces said output count signal for producing a Delayed Clock (DCLK) signal, said SCLK signal being delayed by said variable delay means by an amount proportional to said output count signal to produce said DCLK signal;

providing output means coupled to a portion of said variable delay means which produces said DCLK signal for delivering a Write Enable (WE) signal to said asynchronous cache system;

providing comparing means coupled to a portion of said output means which delivers said WE signal and to said means for providing said SCLK signal for outputting said INCREMENT signal when said comparing means samples an occurrence of a rising edge of said WE signal prior to an occurrence of a rising edge of said SCLK signal;

providing feedback Flip-Flop means having a data input junction coupled to a portion of said comparing means which outputs said INCREMENT signal for providing an output signal;

providing an OR-Gate having an input junction coupled to a portion of said feedback Flip-Flop means which provides said output signal;

providing first D-type Flip-Flop means having a data input junction coupled to an output of said OR-Gate and having an output coupled to said output means for providing data input to said output means;

providing second D-type Flip-Flop means having a data input junction coupled to said output of said first D-type Flip-Flop means for providing said SCLK signal to said comparing means;

providing pulse generator means coupled to a means for providing a RESET signal input and said SCLK signal input for generating an initial START PULSE signal output coupled to an input junction of said OR-Gate;

providing NOR-Gate means having an active low input junction coupled to said means for providing said RESET signal and an output coupled to said first D-type Flip-Flop means, said second D-type Flip-Flop means, and said comparing means for clearing data content of each of said first D-type Flip-Flop means, said second D-type Flip-Flop means, and said comparing means; and providing maximum count detection means coupled to said counter means and to a second active low input junction of said NOR-Gate means for clearing data content of each of said first D-type Flip-Flop means, said second D-type Flip-Flop means, and said comparing means in response to said maximum count detection means reaching a maximum count condition and sending a signal to said second active low input junction of said NOR-Gate to clear said data content of said first D-type Flip-Flop means, said second D-type Flip-Flop means, and said comparing means.

15. The method of claim 14 wherein said counter means has a preselected maximum level up to which said counter means can count.

16. The method of claim 14 wherein said output means is provided with a D-type Flip-Flop having at least an active low input junction coupled to said means for providing said DCLK signal, said D-type Flip-Flop being provided with an active low output junction coupled to a bidirectional Input/Output (I/O) driver.

17. The method of claim 16 wherein said bidirectional I/O driver is provided with an output driver coupled to said active low output junction of said D-type Flip-Flop and an input driver coupled to an output of said output driver, said output driver being provided with an input junction for an OUTPUT ENABLE signal.

18. The method of claim 14 wherein said means for providing said SCLK signal is coupled to each of said counter means, said variable delay means, said comparing means, said feedback Flip-Flop means, said first D-type Flip-Flop means, said second D-type Flip-Flop means, and said pulse generator means.

19. The method of claim 14 wherein said means for providing said RESET signal is coupled to each of said pulse generator means, said NOR-Gate means, and said feedback Flip-Flop means.

20. The method of claim 14 wherein said external system load comprising at least a plurality of Static Random Access Memory (SRAM) type devices.

* * * * *